April 11, 1961 W. J. SCAVUZZO 2,979,021
FILTER UNIT
Filed Jan. 6, 1959

INVENTOR.
WILLIAM J. SCAVUZZO
BY
Lawrence J. Winter
ATTORNEY

United States Patent Office 2,979,021
Patented Apr. 11, 1961

2,979,021
FILTER UNIT

William J. Scavuzzo, Clark, N.J., assignor to Purolator Products, Inc., Rahway, N.J., a corporation of Delaware Filed Jan. 6, 1959, Ser. No. 785,244
6 Claims. (Cl. 116—117)

The present invention relates to a filter unit, and more particularly to a filter unit provided with means for detecting the clogging of the filter element therein.

The present invention is a continuation in part of copending U.S. patent application Serial No. 650,888, entitled Filter Unit, filed April 5, 1957 by William J. Scavuzzo and Frank Romeo, now U.S. Patent 2,878,936.

The instant invention is an improvement upon the invention set forth in the above patent application although it operates upon the same principles described therein. The improvement lies in providing the detecting means which signal when the filter element needs changing with balanced pressure means that enable the detector device to signal only in response to the true pressure differential across the filter element. Thus, the present invention provides a detector device which transmits a signal in response to the actual pressure drop across the filter element rather than a signal which is relative thereto due to changes in the external pressure, generally caused by the atmospheric pressure acting on the detector device. Thus, the present invention provides a detector device which compensates for any variations in the atmospheric pressure in communication with the detector device so that the signal sent is always in response to the actual pressure across the filter element.

The present invention further provides a detector device which will signal when a filter element needs to be changed due to clogging of the filter element by contaminants and will not send a false signal that the filter needs servicing which frequently occurs in such devices, following a pressure drop caused thereacross by cold viscous liquid flowing th rough the filter upon the initial starting of the apparatus with which it is used.

The other objects of the present invention are described and set forth in the above mentioned patent application, although it is to be understood that the improvement thereover has various other features and additional advantages which will be apparent from the following description, when considered in connection with the accompanying drawings forming a part thereof and in which.

Figure 1:
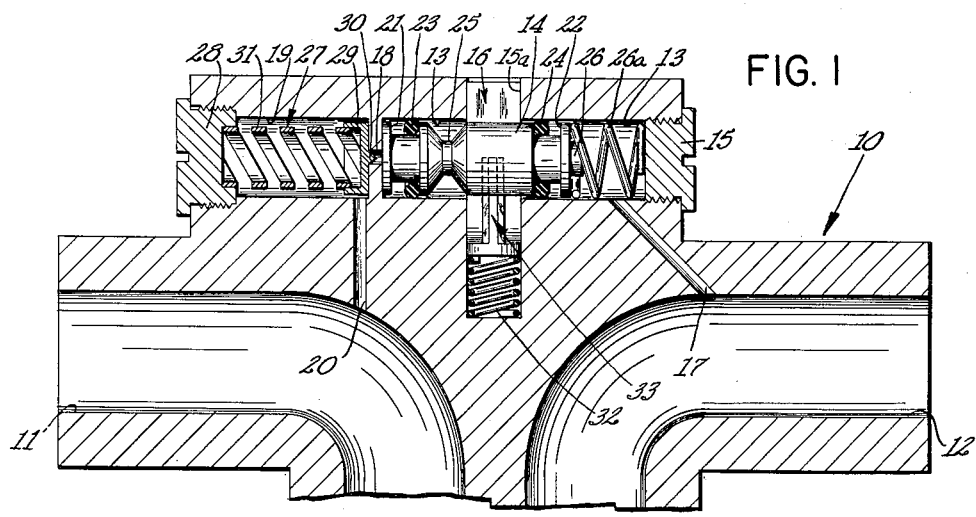
Fig. 1 is a fragmentary vertical sectional view of the filter unit of the present invention with the detecting device shown in a position when the filter element is clean, and upon initial cold starting of the apparatus in which it is used.

Referring to the drawings, the reference numeral 10 generally designates an oil filter housing or body having horizontal inlet and outlet passages or ports 11 and 12 respectively, therein through which high pressure oil is passed for filtering. The upper portion of the housing is provided with a horizontal piston chamber or cylinder 13 in which is disposed a slidable cylindrical piston 14. The open end of the cylinder is closed by a plug 15 threaded therein.

Figure 3:
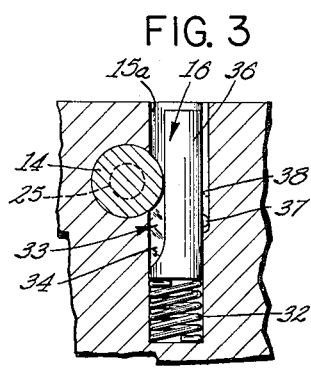
Fig. 3 is a detail side view of the signal member shown in Fig. 1, in its ineffective position.

A vertical cylindrical bore 15a is disposed in the housing approximately midway between the ends of cylinder 13 and has an indicator rod 16 therein. Bore 15a is laterally offset from cylinder 13 as can be seen from Fig. 3 but communicates therewith so that the interior of the cylinder is always in direct communication with the atmosphere or air pressure on the outside or exterior of housing 10. This permits the pressure in chamber 13 to vary with changes in external atmospheric pressure and to remain the same as such external pressure.

Filter unit outlet 12 communicates with chamber 13 through a diagonal passage 17 extending therein adjacent one side of piston 14 therein. The end of chamber 13 adjacent the other side of piston 14 is provided with a central inlet port 18 which communicates with filter inlet 11 through a thermostatic control chamber 19 and vertical passage 20 provided between the inlet and chamber 19.

Piston 14 is provided with peripheral or annular grooves or recesses 21 and 22 therein adjacent its ends, shown exaggerated in the drawings, in which are disposed resilient O rings 23 and 24 respectively, to provide a fluid tight seal between the piston and cylinder side wall to prevent any leakage of oil out of the filter unit through bore 15a. The piston is formed with an annular V-shaped groove or recess in the end thereof adjacent inlet port 18 to provide a space therein through which indicator rod 16 moves to its signalling position when the filter becomes clogged, as hereinafter described. The end of piston 14 adjacent inlet passage 17 is provided with a circular projection 26 thereon for mounting a compression spring 27 thereon. Compression spring 27 maintains a continuous force against the piston to normally keep it positioned against the cylinder end wall adjacent inlet port 18, with V-notch 25 disposed out of alignment with bore 15a or to the left of it, as shown in Fig. 1.

Figure 2:
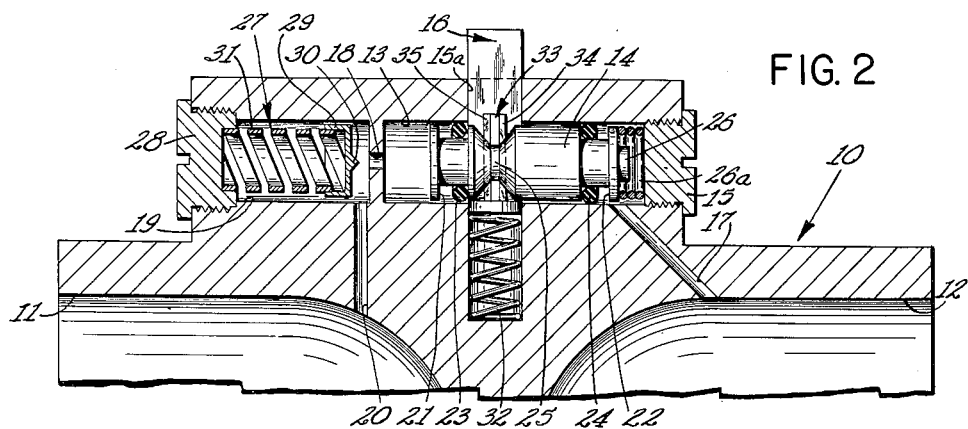
Fig. 2 is a view similar to Fig. 1, but showing the detecting device in a signalling position indicating the filter element requires servicing after the filter element has become clogged.

A cylindrical thermostatic chamber 19 is disposed in alignment with chamber 13 adjacent port 18 and has a bi-metallic coil 27 disposed therein. One end of coil 27 is fixed to the plug 28 threaded therein and the other end is fixed to a circular valve disc 29 having a cone shaped projection 30 in the center thereof adapted to seat against port 18 to close off communication between the piston chamber and filter inlet 11 when the oil flowed through the unit is below a predetermined temperature. When the filter unit is initially placed in operation and the oil flowed therethrough is cold, the coil is in its fully expanded position as shown in Fig. 1 with valve 29 seated in port 18. As the temperature of the oil circulated through the filter gradually rises, the heat therefrom is transmitted to the bi-metallic coil 27 and the individual rings 31 of the coil expand radially due to the heating thereof causing the overall or linear length of the coil to decrease and the coil to assume its contracted position as shown in Fig. 2, and unseat valve 29 from port 18. The provision of the thermostatic control prevents the detection device from giving a false reading upon initial operation that the filter is clogged because of a pressure drop across it resulting from the heavy or viscous oil forced through it.

Figure 4:
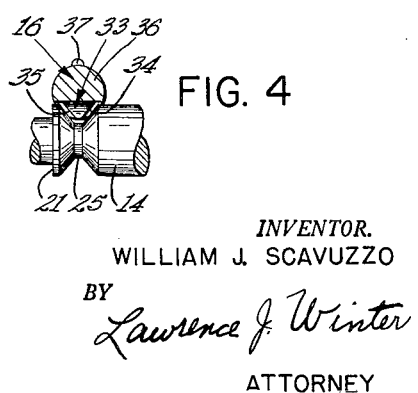
Fig. 4 is a detail plan view of the indicator rod in the extended or signalling position, shown in Fig. 2.

Indicator rod 16 has a compression spring 32 mounted below the lower end thereof to provide a constant force thereagainst urging the rod to the signalling or upper position shown in Fig. 2. The indicator rod is cylindrical and has one side cut away to form a longitudinal rib 33 having tapered sidewalls 34 and 35 adapted to extend through the space provided by piston groove 25 when the rod is in a signalling position. The upper end of rib 33 curves into the semi-circular upper portion 36 (Fig. 4) of the rod and is shaped to seat against the cylindrical surface of piston 14. A pin 37 is provided on rod 16 to slide in a slot 38 (Fig. 3) formed in the wall of bore 15a to prevent the rod and rib 33 from turning or rotating out of position in the bore.

In operation, dirty oil to be filtered flows into housing 10 through inlet 11 and passes through a filter disposed therein not shown, the clean oil being discharged from the housing through outlet opening 12.

If the apparatus with which the filter unit is used, is being initially started and the oil flowing through the filter housing is cold, bi-metallic coil 27 will be in its expanded position as shown in Fig. 1 with port 18 closed. This prevents the cold viscous oil from causing a sufficient pressure drop across the filter element to falsely actuate the filter rod 16 to a position indicating the filter element is clogged.

When the apparatus has been operated a sufficient time and the oil flowing through the filter housing becomes heated, the heat from the oil causes individual rings 31 of bi-metallic coil 27 to expand radially and the coil's linear length to decrease to unseat valve 29 from port 18 and permit the oil in inlet passage 20 to enter chamber 13 and act against piston 14. At this time, the oil being discharged from the filter through outlet 12 will also have its pressure transmitted against the opposite end of piston 14 through passage 17. The piston will be positioned as shown in Fig. 1, with the left end thereof abutting the end wall of the piston chamber due to the force in compression spring 27. Indicator rod 16 is positioned completely within bore 15a (see Fig. 1) with rib 33 abutting the underside of piston 14 (Fig. 3) and the piston preventing the rod from projecting beyond the filter housing. The oil entering the piston chamber through inlet passages 20 and 17 fills the recesses 21 and 22 therein but is prevented from leaking beyond these points by O-ring seals 23 and 24 which form a fluid tight seal with the inner sidewall of the piston chamber. The pressure in chamber 13 on the opposite side of the O-ring seals around the central portion of piston 14 and recess 25 will be the same as the atmosphere or the pressure on the exterior of the filter housing 10. This is because the outside diameter of the slidable piston is slightly less than the inside diameter of the chamber 13 and the chamber communicates with the atmosphere by bore 15a and the cut away part of rod 16 adjacent section 36 thereof (see Fig. 3). Thus, any external pressure which may act on the indicator device of the present invention is transmitted to the piston member by leakage of air around it and equally opposes the upstream and downstream oil pressure in the filter unit acting on the opposite ends of piston 14 through chamber 13 and will therefore be nullified so as not to affect or change the setting at which the indicator rod is actually set to operate or respond. Consequently, the indicator device will detect when the filter element is clogged due to a pressure drop across the filter element corresponding to the pressure drop caused by a clogged filter, rather than in relation to the change in atmospheric pressure or the exterior pressure of the filter housing, since any exterior pressure is balanced or equalized against upstream and downstream pressures in the housing through leakage into the central portion of the cylinder 13 adjacent piston portion 14a and notch 25.

When the pressure drop across the filter element in housing 10 exceeds the predetermined value for which the device is set, the excessive pressure will be transmitted against the end of piston 14 adjacent inlet port 18 and will overcome the force in compression spring 27 normally urging the piston adjacent the left end of the cylinder to move or slide piston 14 toward the right end of the cylinder to the position shown in Fig. 2. The V- notch 25 of the piston will move into alignment with bore 15a and the space provided therein will permit rib 33 of rod 16 to pass therethrough and the rod to move upwardly in bore 15a so that it extends beyond the housing and indicates the need for servicing or replacement of the filter element therein.

Thus, the present invention provides a detecting or signalling means for indicating when a filter element needs changing, similar to the device disclosed in the aforementioned patent, except that the device will respond in accordance with the true pressure drop across the filter element caused solely by a clogged filter and will not be affected by variations in atmospheric or external pressure, because equalizing or balanced pressure means are provided to compensate for these variations. The device also will not be affected by cold viscous oil flowing through the filter element to falsely set off the indicator device upon initial starting of the apparatus with which it is used.

Thus, the present invention further provides an air equalizing passage extending through bore 15a in which the indicator rod 16 is disposed, that permits air pressure on the outside of the filter housing to enter the space around the piston between sealing means 23 and 24 to act in equal and opposite directions, or transversely, against the sealing means. Since the ends of the piston 21 and 22 immersed in the oil have equal areas, any change in external air pressure will not affect the predetermined differential pressure at which the spring load in spring 26a is set to actuate the piston. Also, no matter what the operating pressure of the oil flowing through the filter unit, the signal rod will only be actuated in accordance with the predetermined force in the spring since there is no unbalanced force on the piston or signal rod 16 for different operating conditions of oil flowed therethrough. For example, whether the oil passing through the filter is under 2,000 pounds per square inch or under a pressure of 3,000 pounds per square inch, the piston and signal rod 16 will only be actuated when the differential pressure across the upstream and downstream sides of the filter exceeds the spring force. Thus, the signal device of the present invention will be actuated at the predetermined spring setting without requiring a change of the spring setting for every change in the oil operating pressure.

Inasmuch as various changes may be made in the form, location and relative arrangement of the several parts without departing from the essential characteristics of the invention, it will be understood that the invention is not to be limited except by the scope of the appended claims.

What I claim is:

1. A filter unit comprising a housing having an inlet and outlet therein for flowing fluid to be filtered therethrough, a signal device having a signal position for indicating the need for servicing the unit, a piston chamber having a slidable piston therein, said piston being operatively connected to said signal device to normally maintain it out of its signal position, sealing means sealing off the opposite ends of said piston from the peripheral portion therebetween, fluid passage means communicating with said inlet and said piston chamber adjacent one end of said piston, other fluid passage means communicating with said outlet and said piston chamber adjacent the opposite end of said piston, an air passage communicating with the exterior of the housing and said piston chamber around the central portion of said piston between said sealing means to permit air to enter the space around said piston between said sealing means, said piston being movable in response to changes in the differential pressure between said inlet and outlet to release said signal device to its signal position when said differential pressure exceeds a predetermined value.

2. The filter unit of claim 1 wherein said piston means comprises a horizontally movable piston, and said signal device comprises a vertically slidable member in contact with said piston between said sealing means.

3. The filter unit of claim 1 wherein said air passage comprises a bore laterally offset to one side of said piston chamber, and said signal device is slidably disposed therein.

4. The filter unit of claim 1 wherein said signal device comprises a rod member disposed in said air passage, and said piston is provided with a central portion having a circumferential recess adapted to move into alignment with said rod member when the differential pressure increases above said predetermined value.

5. A filter unit comprising a housing having an inlet and outlet therein for flowing fluid to be filtered therethrough, a vertically slidable rod having a signal position for indicating the need for servicing the unit, a horizontal piston chamber having a slidable piston therein, sealing means sealing off the opposite ends of said piston from the peripheral portion therebetween, fluid passage means communicating with said inlet and said piston chamber adjacent one end of said piston, other fluid passage means communicating with said outlet and said chamber adjacent the opposite end of said piston, a bore laterally offset from said piston chamber between said sealing means, said signal rod being slidably disposed in said bore, said bore providing a space in communication with the exterior of the housing and the space around the piston between said sealing means, said piston being movable in response to changes in the differential pressure between said inlet and outlet to release said signal device to its signal position when said differential pressure exceeds a predetermined value.

6. The filter unit of claim 5 wherein said rod has a cut away portion provided with a longitudinal rib thereon, and said piston has a circumferential recess therein between said sealing means through which said rod is adapted to extend to move to a signal position when the differential pressure exceeds a predetermined value.

References Cited in the file of this patent

UNITED STATES PATENTS

| | | |
|---|---|---|
| 2,729,339 | McCoy | Jan. 3, 1956 |
| 2,843,077 | Leefer | July 15, 1958 |
| 2,878,936 | Scavuzzo et al. | Mar. 24, 1959 |
| 2,935,040 | Steensen | May 3, 1960 |